US009471433B2

(12) United States Patent
Baker et al.

(10) Patent No.: US 9,471,433 B2
(45) Date of Patent: Oct. 18, 2016

(54) OPTIMIZING COMPUTER HARDWARE USAGE IN A COMPUTING SYSTEM THAT INCLUDES A PLURALITY OF POPULATED CENTRAL PROCESSING UNIT ('CPU') SOCKETS

(71) Applicant: LENOVO ENTERPRISE SOLUTIONS (SINGAPORE) PTE. LTD., Singapore (SG)

(72) Inventors: Brian A. Baker, Raleigh, NC (US); Michael Decesaris, Carrboro, NC (US); Jeffrey R. Hamilton, Pittsboro, NC (US); Douglas W. Oliver, Round Rock, TX (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 157 days.

(21) Appl. No.: 14/219,344

(22) Filed: Mar. 19, 2014

(65) Prior Publication Data

US 2015/0269047 A1  Sep. 24, 2015

(51) Int. Cl.
G06F 11/00 (2006.01)
G06F 9/00 (2006.01)
G06F 11/14 (2006.01)
G06F 9/44 (2006.01)

(52) U.S. Cl.
CPC ......... G06F 11/1417 (2013.01); G06F 9/4401 (2013.01); G06F 9/4405 (2013.01); G06F 9/4408 (2013.01); G06F 11/008 (2013.01)

(58) Field of Classification Search
CPC ........... G06F 11/2242; G06F 11/2236; G06F 11/22; G06F 11/2205; G06F 11/3024; G06F 11/1417; G06F 9/4405; G06F 9/4408
See application file for complete search history.

(56) References Cited

U.S. PATENT DOCUMENTS

| 5,491,788 A | * | 2/1996 | Cepulis ............... G06F 11/1417 714/13 |
| 6,442,685 B1 | | 8/2002 | French et al. |
| 6,708,283 B1 | * | 3/2004 | Nelvin ............... G06F 11/2005 710/316 |
| 7,231,464 B1 | | 6/2007 | Caudrelier et al. |
| 7,954,114 B2 | | 5/2011 | Chamberlain et al. |
| 7,971,094 B1 | | 6/2011 | Benn et al. |
| 8,375,363 B2 | | 2/2013 | Zhou et al. |
| 8,839,032 B2 | * | 9/2014 | Walton ......................... 709/224 |
| 2003/0233492 A1 | | 12/2003 | Schelling |
| 2010/0174868 A1 | | 7/2010 | Vorbach |

(Continued)

FOREIGN PATENT DOCUMENTS

WO    WO94008291 A1    4/1994

Primary Examiner — Bryce Bonzo
Assistant Examiner — Anthony J Amoroso
(74) Attorney, Agent, or Firm — Brandon C. Kennedy; Katherine S. Brown; Kennedy Lenart Spraggins LLP (57) ABSTRACT

Optimizing computer hardware usage in a computing system that includes a plurality of populated central processing unit ('CPU') sockets, including: determining, by a socket configuration module, a number of CPUs to be utilized during operation of the computing system; determining, by the socket configuration module, error characteristics associated with each available CPU, wherein the error characteristics associated with each available CPU include error information for computing devices that are coupled to one or more of the available CPUs; and selecting, by the socket configuration module in dependence upon the error characteristics associated with each available CPU and a predetermined error tolerance policy, a target CPU to utilize as a boot CPU.

19 Claims, 4 Drawing Sheets

(56) References Cited

U.S. PATENT DOCUMENTS

2013/0091380 A1  4/2013  Decesaris et al.
2015/0268967 A1  9/2015  Baker et al.
2015/0269015 A1  9/2015  Baker et al.

* cited by examiner

# OPTIMIZING COMPUTER HARDWARE USAGE IN A COMPUTING SYSTEM THAT INCLUDES A PLURALITY OF POPULATED CENTRAL PROCESSING UNIT ('CPU') SOCKETS

BACKGROUND OF THE INVENTION

1. Field of the Invention

The field of the invention is data processing, or, more specifically, methods, apparatus, and products for optimizing computer hardware usage in a computing system that includes a plurality of populated central processing unit ('CPU') sockets.

2. Description of Related Art

Modern computing systems may include a plurality of computer processors such as a plurality of CPUs. Each CPU can be mounted in a CPU socket. The CPUs that are chosen to be active in a multi-socket system are frequently chosen based on a sequential socket identifier assignment. For example, the CPUs in socket 0, socket 1, socket 2, and socket 3 may be active while CPUs in socket 4 and socket 5 may be inactive. Furthermore, the CPU that will be used to boot the computing system may also be designated based on the socket identifier, such that the CPU in socket 0 will be utilized to boot the computing system. In such a way, the designation of a socket identifier is used to identify active CPUs and a boot CPU, with no consideration given to the rate at which an individual CPU or a particular combination of CPUs generate errors, the type of errors generated by an individual CPU or a particular combination of CPUs, or any other consideration related to the generation of errors.

SUMMARY OF THE INVENTION

Methods, apparatuses, and products for optimizing computer hardware usage in a computing system that includes a plurality of populated central processing unit ('CPU') sockets, including: determining, by a socket configuration module, a number of CPUs to be utilized during operation of the computing system; determining, by the socket configuration module, error characteristics associated with each available CPU, wherein the error characteristics associated with each available CPU include error information for computing devices that are coupled to one or more of the available CPUs; and selecting, by the socket configuration module in dependence upon the error characteristics associated with each available CPU and a predetermined error tolerance policy, a target CPU to utilize as a boot CPU.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
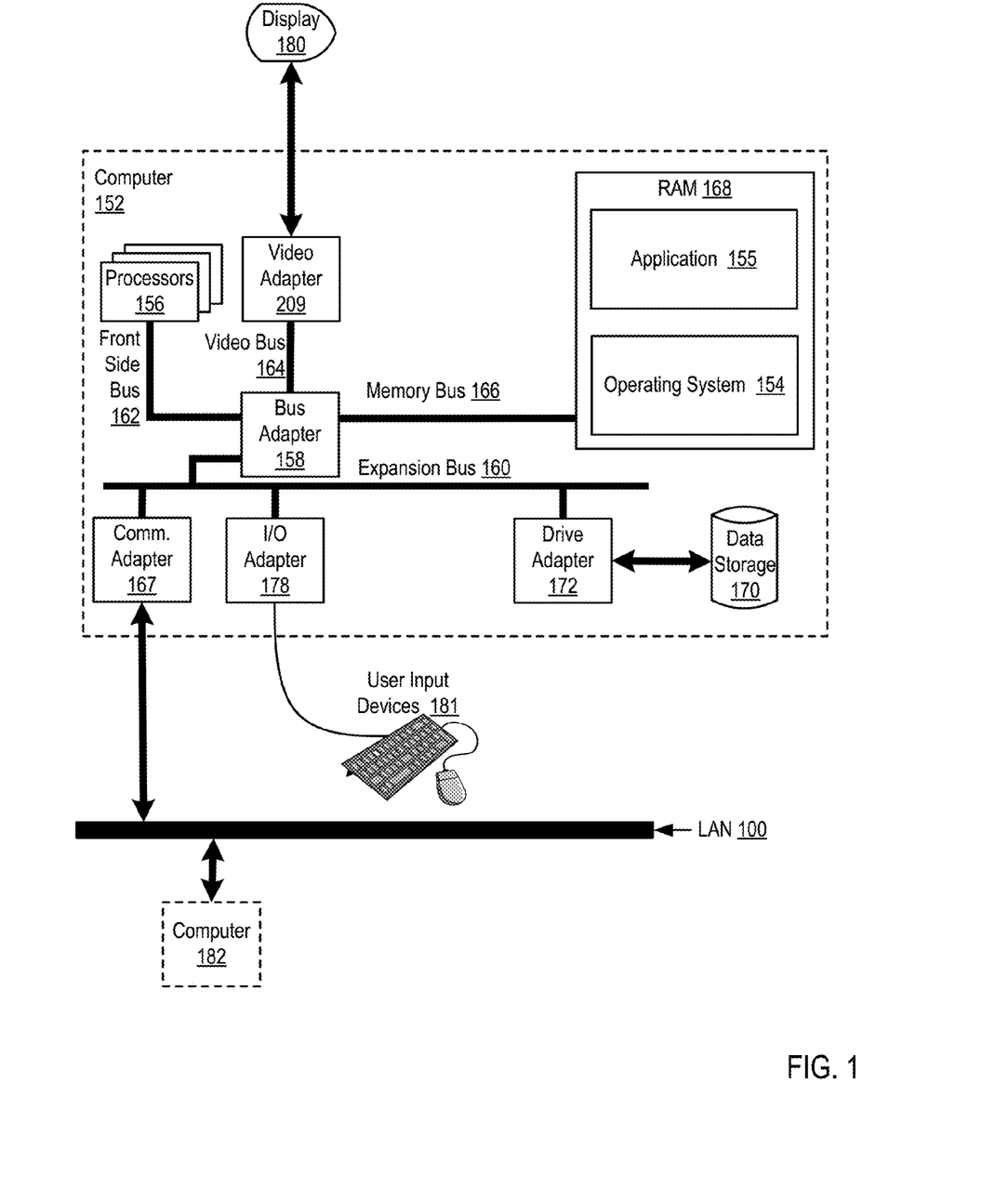
FIG. 1 sets forth a block diagram of automated computing machinery comprising an example computer useful in optimizing computer hardware usage according to embodiments of the present invention.

FIG. 1 sets forth a block diagram of automated computing machinery comprising an example computer (152) useful in optimizing computer hardware usage according to embodiments of the present invention. The computer (152) of FIG. 1 includes at least one computer processor (156) or 'CPU' as well as random access memory (168) ('RAM') which is connected through a high speed memory bus (166) and bus adapter (158) to the processor (156) and to other components of the computer (152). Although not illustrated in FIG. 1, the computer (152) depicted in FIG. 1 can include a plurality of populated CPU sockets. Each CPU socket may be embodied as a mechanical component that provides mechanical and electrical connections between a processor (156) and a printed circuit board ('PCB'). A CPU socket is 'populated' when a CPU is installed within the CPU socket.

Stored in RAM (168) is an application (155), a module of computer program instructions that, when executed on computer hardware such as the processor (156), causes the computer (152) to perform useful tasks beyond the running of the computer (152) itself. The application (155) may be embodied, for example, as accounting software, enterprise software, graphics software, media players, office suites, and so on.

Also stored in RAM (168) is an operating system (154). Operating systems useful optimizing computer hardware usage according to embodiments of the present invention include UNIX™, Linux™, Microsoft XP™, AIX™, IBM's i5/OS™, and others as will occur to those of skill in the art. The operating system (154) and the application (155) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for optimizing computer hardware usage according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for optimizing computer hardware usage according to embodiments of the present invention include modems for wired dial-up communications, Ethernet (IEEE 802.3) adapters for wired data communications network communications, and 802.11 adapters for wireless data communications network communications.

Figure 2:
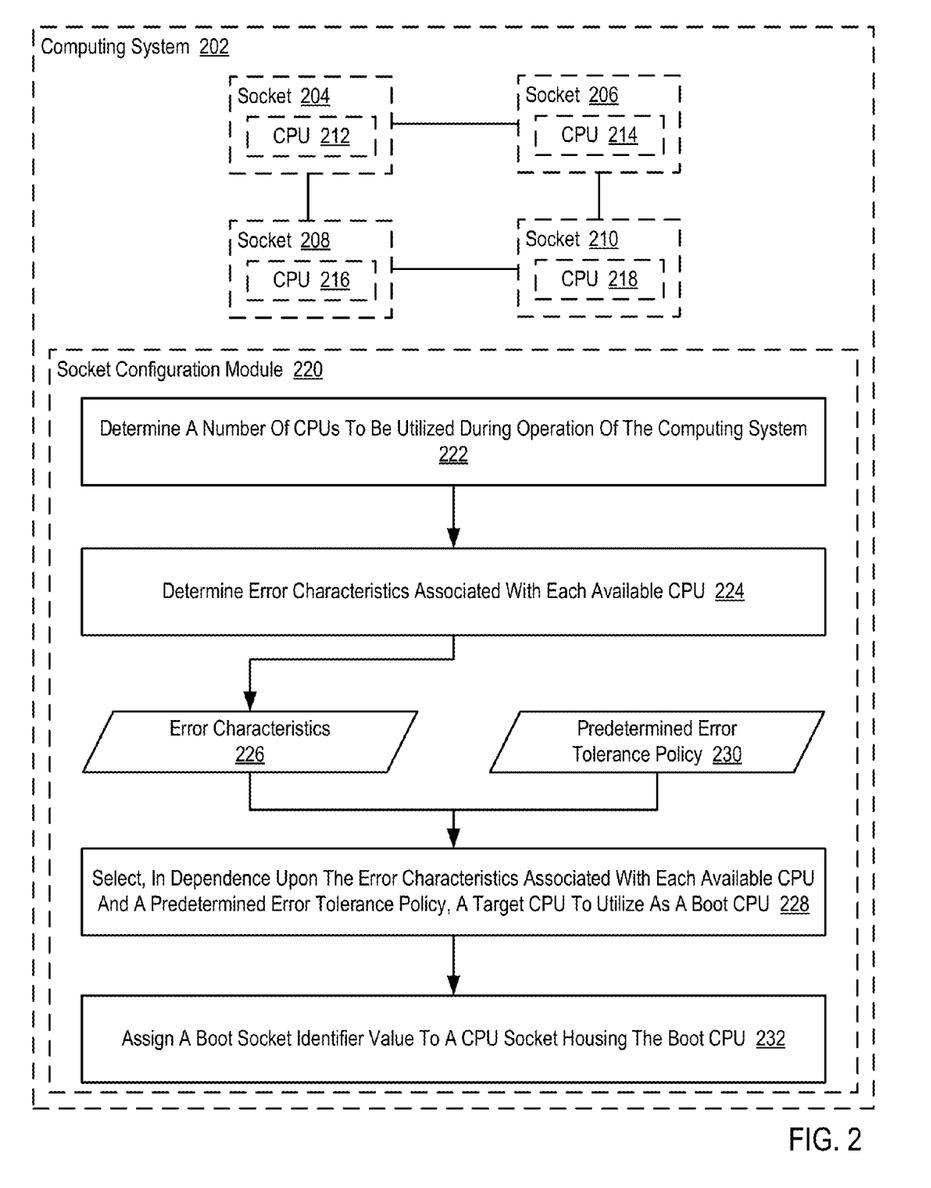
FIG. 2 sets forth a flow chart illustrating an example method for optimizing computer hardware usage in a computing system that includes a plurality of populated CPU sockets according to embodiments of the present invention.

For further explanation, FIG. 2 sets forth a flow chart illustrating an example method for optimizing computer hardware usage in a computing system (202) that includes a plurality of populated CPU sockets (204, 206, 208, 210) according to embodiments of the present invention. The computing system (202) of FIG. 2 may be embodied, for example, as a server, a blade server in a blade center, a desktop computer, and so on. The computing system illustrated in FIG. 2 includes four CPU sockets (204, 206, 208, 210), although in other embodiments the computing system (202) can include any number of two or more CPU sockets. Each CPU socket (204, 206, 208, 210) in FIG. 2 may be embodied as a mechanical component that provides mechanical and electrical connections between a CPU (212, 214, 16, 218) and a PCB. A CPU socket (204, 206, 208, 210) is 'populated' when a CPU (212, 214, 16, 218) is installed within the CPU socket (204, 206, 208, 210).

The example method depicted in FIG. 2 is carried out, at least in part, by a socket configuration module (220). The socket configuration module (220) of FIG. 2 may be embodied, for example, as a module of computer program instructions executing on computer hardware. In some embodiments, the socket configuration module (220) may be embodied as a standalone component such as a field-programmable gate array ('FPGA'), application-specific integrated circuit ('ASIC'), and so on. In alternative embodiments, the socket configuration module (220) may be embodied as computer program instructions that are included in a system management module or other centralized management utility and executed on computer hardware that supports such a system management module or other centralized management utility.

The example method depicted in FIG. 2 includes determining (222), by the socket configuration module (220), a number of CPUs (212, 214, 216, 218) to be utilized during operation of the computing system (202). The computing system (202) of FIG. 2 may be configured, for example, to utilize a number of CPUs (212, 214, 216, 218) that is a power of two during operation of the computing system (202), such that the computing system (202) may operate using one CPU, two CPUs, four CPUs, eight CPUs, and so on. If one CPU (212) illustrated in FIG. 2 fails and becomes inoperable, the computing system (202) of FIG. 2 may therefore be unable to use each of the remaining three CPUs (214, 16, 218) depicted in FIG. 2, as the computing system (202) may not be configured to operate using a three CPU configuration.

Determining (222) the number of CPUs (212, 214, 216, 218) to be utilized during operation of the computing system (202) may be carried out, for example, by the socket configuration module (220) determining how many operational CPUs are installed in the computing system (202). In such an example, the socket configuration module (220) may determine how many operational CPUs are installed in the computing system (202) by initiating a discovery process. After determining how many operational CPUs are installed in the computing system (202), the socket configuration module (220) may subsequently identify the largest number of CPUs that the computing system (202) is configured to utilize that is less than or equal to the number of operational CPUs that are installed in the computing system (202). For example, if the computing system (202) has seven operational CPUs and is configured to operate in a one CPU configuration, a two CPU configuration, a four CPU configuration, and an eight CPU configuration, the socket configuration module (220) may determine (222) that the number of CPUs to be utilized during operation of the computing system (202) should be set to a value of four.

The example method depicted in FIG. 2 also includes determining (224), by the socket configuration module (220), error characteristics (226) associated with each available CPU (212, 214, 216, 218). The error characteristics (226) associated with each available CPU (212, 214, 216, 218) may include error information generated during the operation of each available CPU (212, 214, 216, 218) such as, for example, the frequency at which each available CPU (212, 214, 216, 218) generates an error, the types of errors generated by each available CPU (212, 214, 216, 218), the severity level of each error generated by each available CPU (212, 214, 216, 218), and so on. The error characteristics (226) associated with each available CPU (212, 214, 216, 218) may also include error information that describes the operation of other computing devices that are attached to each available CPU (212, 214, 216, 218). Such error information that describes the operation of other computing devices that are attached to each available CPU (212, 214, 216, 218) may include, for example, the type, rate, and frequency of errors generated by off-chip memory such as RAM that is coupled to each available CPU (212, 214, 216, 218), the type, rate, and frequency of errors generated by I/O devices that are coupled to each available CPU (212, 214, 216, 218), and so on.

In the example method depicted in FIG. 2, determining (224) the error characteristics (226) associated with each available CPU (212, 214, 216, 218) may be carried out, for example, by the socket configuration module (220) examining error logs and other repositories of error information that are maintained during normal boot and run time operation of the computing system (202). In such an example, the socket configuration module (220) or other management module may maintain an error log that identifies error conditions that occurred during boot or run time operation of the computing system (202). Each entry in such an error log may include information identifying the type of error that occurred, the time at which the error occurred, the computing device in which the error occurred, and so on. By examining error logs and other repositories of error information, the socket configuration module (220) can determine (224) the error characteristics (226) associated with each available CPU (212, 214, 216, 218) by identifying errors generated by each available CPU (212, 214, 216, 218) as well as errors generated by downstream devices that are coupled to each available CPU (212, 214, 216, 218).

The example method depicted in FIG. 2 also includes selecting (228), by the socket configuration module (220) in dependence upon the error characteristics (226) associated with each available CPU (212, 214, 216, 218) and a predetermined error tolerance policy (230), a target CPU to utilize as a boot CPU. In the example method of FIG. 2, when the computing system (202) is initially booted, one CPU will be responsible for executing the system BIOS and other computer program instructions used to boot the computing system (202). The CPU that is responsible for executing the computer program instructions that are used to boot the computing system (202) is referred herein as the boot CPU.

The predetermined error tolerance policy (230) of FIG. 2 represents a specification of error avoidance preferences for the computing system (202), including error avoidance preferences for the computing system (202) during boot-up of the computing system (202). The predetermined error tolerance policy (230) may indicate, for example, that correctable CPU errors are preferred over non-correctable CPU errors, such that a CPU that generates the fewest number of non-correctable errors may be selected (228) to be utilized as the boot CPU. Alternatively, correctable CPU errors may be given a lower weighting that non-correctable CPU errors in an error score calculation formula that takes into account both the number of correctable errors and the number of non-correctable errors, such that the CPU associated with the lowest error score may be selected (228) to be utilized as the boot CPU. Readers will appreciate that predetermined error tolerance policy (230) may take into account many types of errors generated by the CPUs (212, 214, 216, 218) themselves, but also many types of errors generated by downstream devices such as memory modules, I/O devices, and other devices that are coupled to the CPUs (212, 214, 216, 218).

In the example method depicted in FIG. 2, selecting (228) a target CPU to utilize as a boot CPU in dependence upon the error characteristics (226) associated with each available CPU (212, 214, 216, 218) and a predetermined error tolerance policy (230) may be carried out, for example, by the socket configuration module (220) applying an error score calculation formula identified in the predetermined error tolerance policy (230), using the error characteristics (226) associated with each available CPU (212, 214, 216, 218) as inputs to such an error score calculation formula. In such an example, the available CPU (212, 214, 216, 218) with the best error score (which may indicate the least incidence of error) may be selected (228) as the target CPU to utilize as the boot CPU.

The example method depicted in FIG. 2 also includes assigning (232), by the socket configuration module (220), a boot socket identifier value to a CPU socket housing the boot CPU. The computing system (202) of FIG. 2 may be configured to automatically utilize a CPU housed in a CPU socket identified by a predetermined socket identifier as the boot CPU. For example, the computing system (202) may be configured to automatically utilize a CPU housed in a CPU socket identified by a socket identifier of '0' as the boot CPU, where each CPU socket (204, 206, 208, 210) is associated with a socket identifier value of 0, 1, 2, or 3. In such an example, the socket configuration module (220) may assign (232) a socket identifier value of '0' to the CPU socket that houses the CPU selected (228) to be utilized as the boot CPU.

Figure 3:
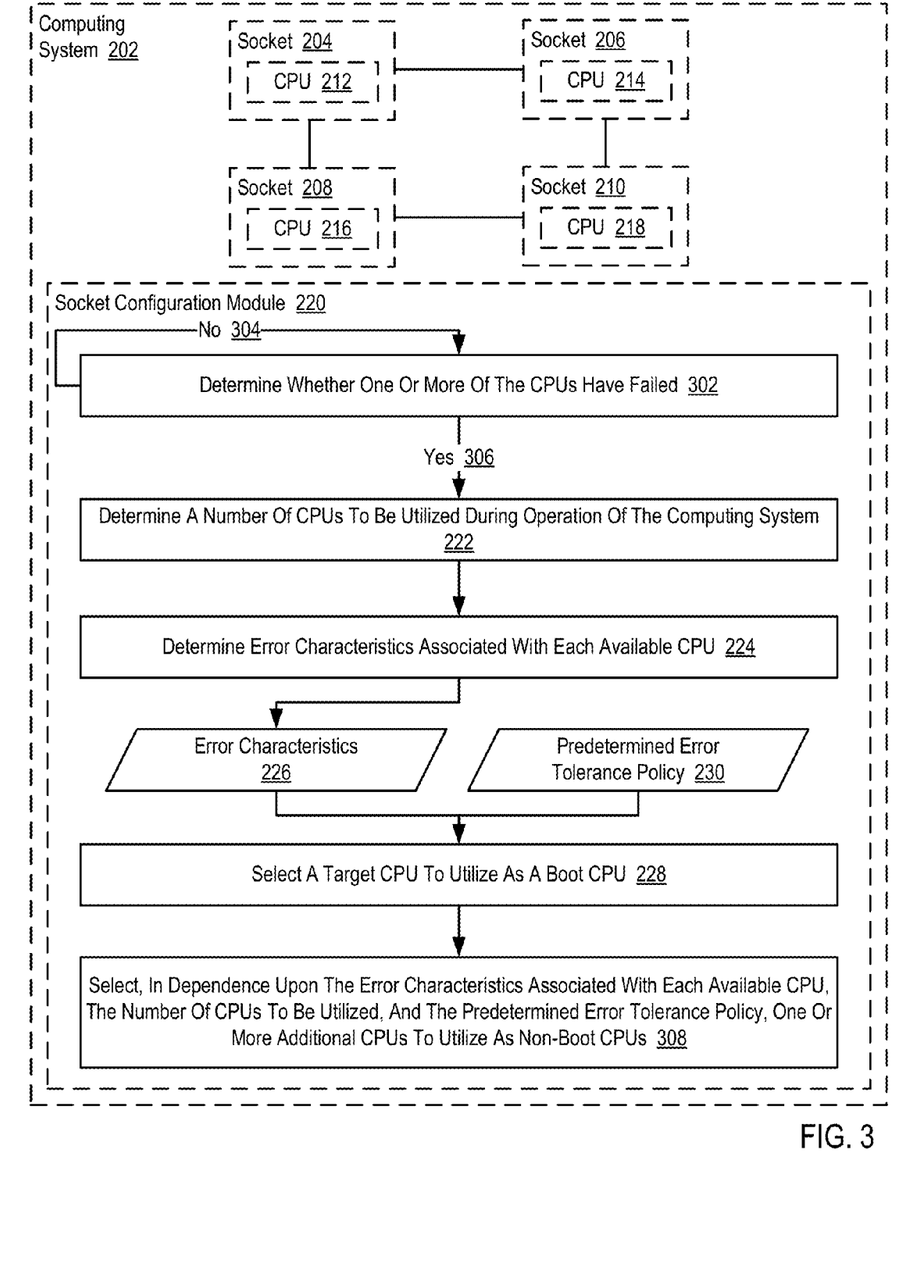
FIG. 3 sets forth a flow chart illustrating an additional example method for optimizing computer hardware usage in a computing system that includes a plurality of populated CPU sockets according to embodiments of the present invention.

For further explanation, FIG. 3 sets forth a flow chart illustrating an additional example method for optimizing computer hardware usage in a computing system (202) that includes a plurality of populated CPU sockets (204, 206, 208, 210) according to embodiments of the present invention. The example method depicted in FIG. 3 is similar to the example method depicted in FIG. 2, as it also includes determining (222) a number of CPUs (212, 214, 216, 218) to be utilized during operation of the computing system (202), determining (224) error characteristics (226) associated with each available CPU (212, 214, 216, 218), and selecting (228) a target CPU to utilize as a boot CPU in dependence upon the error characteristics (226) associated with each available CPU (212, 214, 216, 218) and a predetermined error tolerance policy (230).

The example method depicted in FIG. 3 also includes determining (302), by the socket configuration module (220), whether one or more of the CPUs (212, 214, 216, 218) have failed. Determining (302) whether one or more of the CPUs (212, 214, 216, 218) have failed may be carried out, for example, by the socket configuration module (220) monitoring a communications channel for error messages generated by one or more of the CPUs (212, 214, 216, 218), by the socket configuration module (220) determining that one or more of the CPUs (212, 214, 216, 218) have become unresponsive, and so on.

In the example method depicted in FIG. 3, steps 222, 224, and 228 depicted in FIG. 3 and described above with reference to FIG. 2 are carried out in response to affirmatively (306) determining that one or more of the CPUs (212, 214, 216, 218) have failed. Readers will appreciate that when one or more of the CPUs (212, 214, 216, 218) have failed, the total number of CPUs available for use during operation of the computing system (202) has changed. In view of the fact that only certain CPU configurations (e.g., 1 CPU, 2 CPUs, 4 CPUs, 8 CPUs, and so on) may be supported by the computing system (202), the number of CPUs to be utilized during operation of the computing system (202) may need to be reevaluated.

Consider an example in which the computing system (202) is operating in a 4 CPU configuration when a particular CPU (212) fails. In such an example, the computing system (202) may not be able to simply operate using the remaining 3 available CPUs (214, 216, 218). The socket configuration module (220) may therefore be configured, for example, to determine (222) a number of the remaining available CPUs (214, 216, 218) to be utilized during operation of the computing system (202), determine (224) error characteristics (226) associated with each available CPU (214, 216, 218), and select (228) a target CPU to utilize as a boot CPU in dependence upon the error characteristics (226) associated with each of the remaining three available CPUs (214, 216, 218) and a predetermined error tolerance policy (230).

The example method depicted in FIG. 3 also includes selecting (308), by the socket configuration module (220) in dependence upon the error characteristics (226) associated with each available CPU (212, 214, 216, 218), the number of CPUs to be utilized, and the predetermined error tolerance policy (230), one or more additional CPUs to utilize as non-boot CPUs. As described above, the socket configuration module (220) selects (228) a particular target CPU to utilize as the boot CPU. After selecting (228) a particular target CPU to utilize as the boot CPU, the socket configuration module (220) may select (308) one or more additional CPUs to utilize as non-boot CPUs in order to most appropriately avoid the generation of specific errors by utilizing the CPUs that best satisfy the predetermined error tolerance policy (230).

Consider an example in which the predetermined error tolerance policy (230) specifies that CPUs that historically generate the lowest number of errors of any sort are preferred. In such an example, assume that CPU (212) was selected (228) as the boot CPU by virtue of being characterized by an error rate that is lower than the remaining CPUs (214, 216, 218). After selecting (228) CPU (212) as the boot CPU, the socket configuration module (220) may examine the error characteristics (226) associated with the remaining CPUs (214, 216, 218) to identify which of the remaining CPU (214, 216, 218) is characterized by a lowest error rate. The remaining CPU (214, 216, 218) that is characterized by the lowest error rate may subsequently be selected (308) to be utilized as a non-boot CPU. In such an example, this process may be repeated until the socket configuration module (220) has identified a number of CPUs that is equal to the number of CPUs that the socket configuration module (220) previously determined (222) are to be utilized during operation of the computing system (202).

Figure 4:
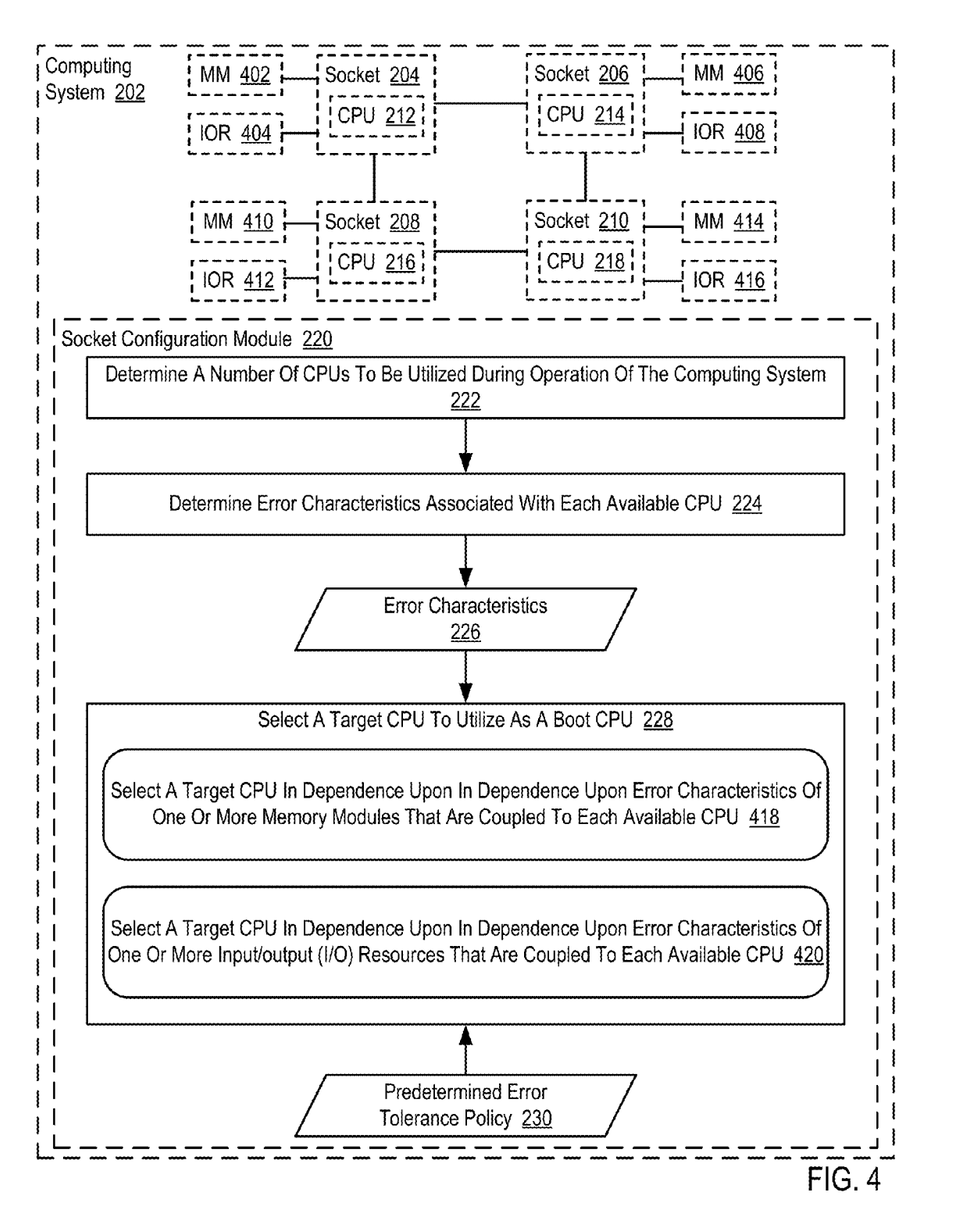
FIG. 4 sets forth a flow chart illustrating an additional example method for optimizing computer hardware usage in a computing system that includes a plurality of populated CPU sockets according to embodiments of the present invention.

For further explanation, FIG. 4 sets forth a flow chart illustrating an additional example method for optimizing computer hardware usage in a computing system (202) that includes a plurality of populated CPU sockets (204, 206, 208, 210) according to embodiments of the present invention. The example method depicted in FIG. 4 is similar to the example method depicted in FIG. 2, as it also includes determining (222) a number of CPUs (212, 214, 216, 218) to be utilized during operation of the computing system (202), determining (224) error characteristics (226) associated with each available CPU (212, 214, 216, 218), and selecting (228) a target CPU to utilize as a boot CPU in dependence upon the error characteristics (226) associated with each available CPU (212, 214, 216, 218) and a predetermined error tolerance policy (230).

In the example method depicted in FIG. 4, selecting (228) a target CPU to utilize as a boot CPU in dependence upon the error characteristics (226) associated with each available CPU (212, 214, 216, 218) and a predetermined error tolerance policy (230) can include selecting (418) a target CPU in dependence upon error characteristics of one or more memory modules (402, 406, 410, 414) that are coupled to each available CPU (212, 214, 216, 218). In the example method depicted in FIG. 4, each CPU (212, 214, 216, 218) may be coupled to one or more memory modules (402, 404, 406, 408) via a memory bus and a memory controller. Each memory module (402, 404, 406, 408) may be embodied, for example, as a dual in-line memory module ('DIMM'), single in-line memory module ('SIMM'), and so on.

In the example method depicted in FIG. 4, the error characteristics of one or more memory modules (402, 406, 410, 414) that are coupled to the target CPU describe one or more error conditions that are associated with the operation of the memory modules (402, 406, 410, 414). The one or more error conditions that are associated with the operation of the memory modules (402, 406, 410, 414) may include, for example, an error encountered when attempting to write to an address in a memory module (402, 406, 410, 414), an error encountered when attempting to read from an address in a memory module (402, 406, 410, 414), an error encountered which indicates that a particular software driver installed in the computing system (202) is incompatible with a memory module (402, 406, 410, 414) installed in the computing system (202), an error encountered which indicates that a memory bus that connects a memory module (402, 406, 410, 414) to a particular CPU (212, 214, 216, 218) is inoperable, and so on. In such a way, a predetermined error tolerance policy (230) that places a premium on reliable memory access may result in a target CPU that is connected to more reliably accessed memory modules being selected (228) as the boot CPU, while a predetermined error tolerance policy (230) that places less of a premium on reliable memory access may result in a target CPU that is connected to less reliably accessed memory modules being selected (228) as the boot CPU.

In the example method depicted in FIG. 4, selecting (228) a target CPU to utilize as a boot CPU in dependence upon the error characteristics (226) associated with each available CPU (212, 214, 216, 218) and a predetermined error tolerance policy (230) can include selecting (420) a target CPU in dependence upon error characteristics of one or more I/O resources (404, 408, 412, 416) that are coupled to the target CPU. The one or more I/O resources (404, 408, 412, 416) depicted in FIG. 4 may be embodied, for example, as a mezzanine card, as an expansion card, or as another piece of computing equipment that is coupled to a particular CPU via an expansion bus such as a Peripheral Component Interconnect ('PCI') bus, Peripheral Component Interconnect Express ('PCIe') bus, and so on. Such I/O resources (404, 408, 412, 416) can include video cards, sound cards, network cards, modems, or any other computing component useful in delivering output to a user of the computing system (202) and receiving input from a user of the computing system (202).

The error characteristics of one or more I/O resources (404, 408, 412, 416) describe one or more error conditions that are associated with the operation of the I/O resources (404, 408, 412, 416). The error conditions that are associated with the operation of the I/O resources (404, 408, 412, 416) can include, for example, an error encountered when attempting to access a particular I/O resource (404, 408, 412, 416), an error encountered when attempting to carry out a particular function provided by a particular I/O resource (404, 408, 412, 416), and so on. In such a way, a predetermined error tolerance policy (230) that places a premium on reliable I/O resources (404, 408, 412, 416) may result in a target CPU that is connected to more reliable I/O resources (404, 408, 412, 416) being selected (228) as the boot CPU, while a predetermined error tolerance policy (230) that places less of a premium on reliable I/O resources (404, 408, 412, 416) may result in a target CPU that is connected to less reliable I/O resources (404, 408, 412, 416) being selected (228) as the boot CPU.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
by computer program instructions on a computing device, determining a number of central processing units (CPUs) to be utilized during operation of the computing system;
determining error characteristics associated with each available CPU, wherein the error characteristics associated with each available CPU include error information for computing devices that are coupled to one or more of the available CPUs, wherein the error information comprises a rate of errors generated by computing devices that are coupled to one or more of the available CPUs, and wherein the error characteristics comprise an error score; and
selecting in dependence upon the error characteristics associated with each available CPU and a predetermined error tolerance policy, a target CPU to utilize as a boot CPU, wherein selecting the target CPU comprises selecting the target CPU from the available CPUs based on the error score of each available CPU.

2. The method of claim 1 further comprising assigning-a boot socket identifier value to a CPU socket housing the boot CPU.

3. The method of claim 1 further comprising selecting in dependence upon the error characteristics associated with each available CPU, the number of CPUs to be utilized, and the predetermined error tolerance policy, one or more additional CPUs to utilize as non-boot CPUs.

4. The method of claim 1 further comprising determining whether one or more of the CPUs have failed.

5. The method of claim 1 wherein selecting in dependence upon the error characteristics associated with each available CPU and a predetermined error tolerance policy, a target CPU to utilize as a boot CPU further comprises selecting a target CPU in dependence upon error characteristics of one or more memory modules that are coupled to each available CPU.

6. The method of claim 1 wherein selecting in dependence upon the error characteristics associated with each available CPU and a predetermined error tolerance policy, a target CPU to utilize as a boot CPU further comprises selecting a target CPU in dependence upon error characteristics of one or more input/output ('I/O') resources that are coupled to each available CPU.

7. An apparatus comprising a computer processor and a computer memory operatively coupled to the computer processor, the computer memory having disposed within it computer program instructions that, when executed by the computer processor, cause the apparatus to carry out the steps of:
    determining a number of central processing units (CPUs) to be utilized during operation of the computing system;
    determining error characteristics associated with each available CPU, wherein the error characteristics associated with each available CPU include error information for computing devices that are coupled to one or more of the available CPUs, wherein the error information comprises a rate of errors generated by computing devices that are coupled to one or more of the available CPUs, and wherein the error characteristics comprise an error score; and
    selecting in dependence upon the error characteristics associated with each available CPU and a predetermined error tolerance policy, a target CPU to utilize as a boot CPU, wherein selecting the target CPU comprises selecting the target CPU from the available CPUs based on the error score of each available CPU.

8. The apparatus of claim 7 further comprising computer program instructions that, when executed by the computer processor, cause the apparatus to carry out the step of assigning-a boot socket identifier value to a CPU socket housing the boot CPU.

9. The apparatus of claim 7 further comprising computer program instructions that, when executed by the computer processor, cause the apparatus to carry out the step of selecting in dependence upon the error characteristics associated with each available CPU, the number of CPUs to be utilized, and the predetermined error tolerance policy, one or more additional CPUs to utilize as non-boot CPUs.

10. The apparatus of claim 7 further comprising computer program instructions that, when executed by the computer processor, cause the apparatus to carry out the step of determining whether one or more of the CPUs have failed.

11. The apparatus of claim 7 wherein selecting in dependence upon the error characteristics associated with each available CPU and a predetermined error tolerance policy, a target CPU to utilize as a boot CPU further comprises selecting a target CPU in dependence upon error characteristics of one or more memory modules that are coupled to each available CPU.

12. The apparatus of claim 7 wherein selecting in dependence upon the error characteristics associated with each available CPU and a predetermined error tolerance policy, a target CPU to utilize as a boot CPU further comprises selecting a target CPU in dependence upon error characteristics of one or more input/output ('I/O') resources that are coupled to each available CPU.

13. A computer program product including a computer readable medium, wherein the computer readable medium is not a signal, the computer program product comprising computer program instructions that, when executed, cause a computer to carry out the steps of:
    determining a number of central processing units (CPUs) to be utilized during operation of the computing system;
    determining error characteristics associated with each available CPU, wherein the error characteristics associated with each available CPU include error information for computing devices that are coupled to one or more of the available CPUs, wherein the error information comprises a rate of errors generated by computing devices that are coupled to one or more of the available CPUs, and wherein the error characteristics comprise an error score; and
    selecting in dependence upon the error characteristics associated with each available CPU and a predetermined error tolerance policy, a target CPU to utilize as a boot CPU, wherein selecting the target CPU comprises selecting the target CPU from the available CPUs based on the error score of each available CPU.

14. The computer program product of claim 13 further comprising computer program instructions that, when executed, cause the computer to carry out the step of assigning-a boot socket identifier value to a CPU socket housing the boot CPU.

15. The computer program product of claim 13 further comprising computer program instructions that, when executed, cause the computer to carry out the step of selecting in dependence upon the error characteristics associated with each available CPU, the number of CPUs to be utilized, and the predetermined error tolerance policy, one or more additional CPUs to utilize as non-boot CPUs.

16. The computer program product of claim 13 further comprising computer program instructions that, when executed, cause the computer to carry out the step of determining whether one or more of the CPUs have failed.

17. The computer program product of claim 13 wherein selecting in dependence upon the error characteristics associated with each available CPU and a predetermined error tolerance policy, a target CPU to utilize as a boot CPU further comprises selecting a target CPU in dependence upon error characteristics of one or more memory modules that are coupled to each available CPU.

18. The computer program product of claim 13 wherein selecting in dependence upon the error characteristics associated with each available CPU and a predetermined error tolerance policy, a target CPU to utilize as a boot CPU further comprises selecting a target CPU in dependence upon error characteristics of one or more input/output ('I/O') resources that are coupled to each available CPU.

19. The computer program product of claim 13 wherein the computer readable medium comprises a storage medium.

* * * * *